US011111836B2

(12) United States Patent
Collura et al.

(10) Patent No.: US 11,111,836 B2
(45) Date of Patent: Sep. 7, 2021

(54) REDUCTANT INJECTION SYSTEM

(71) Applicant: LIEBHERR-COMPONENTS COLMAR SAS, Colmar (FR)

(72) Inventors: Salvatore Collura, Luttenbach (FR); Martin Amann, Fegersheim (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 0 days.

(21) Appl. No.: 16/618,090

(22) PCT Filed: May 29, 2018

(86) PCT No.: PCT/EP2018/064065
§ 371 (c)(1),
(2) Date: Nov. 27, 2019

(87) PCT Pub. No.: WO2018/219947
PCT Pub. Date: Dec. 6, 2018

(65) Prior Publication Data
US 2020/0191032 A1 Jun. 18, 2020

(30) Foreign Application Priority Data
May 29, 2017 (DE) .................... 10 2017 111 619.2

(51) Int. Cl.
*F01N 3/20* (2006.01)
*F01N 9/00* (2006.01)
(52) U.S. Cl.
CPC ............. *F01N 3/208* (2013.01); *F01N 9/00* (2013.01); *F01N 2560/026* (2013.01);
(Continued)

(58) Field of Classification Search
CPC combination set(s) only.
See application file for complete search history.

(56) References Cited

U.S. PATENT DOCUMENTS 7,647,767 B2 * 1/2010 Osaku .................. F01N 3/2066
60/286
9,222,391 B2 * 12/2015 Ikeda .................... F01N 3/2046
(Continued)

FOREIGN PATENT DOCUMENTS

DE 102007028480 A1 12/2008
DE 102008049097 A1 4/2010
(Continued)

OTHER PUBLICATIONS

ISA European Patent Office, International Search Report and Written Opinion Issued in Application No. PCT/EP2018/064065, dated Jul. 5, 2018, WIPO, 22 pages.

*Primary Examiner* — Binh Q Tran
(74) *Attorney, Agent, or Firm* — McCoy Russell LLP

(57) ABSTRACT

The present disclosure provides a reductant injection system for an SCR catalyst of an internal combustion engine, the reductant injection system comprising at least one injector, a first storage container for storing liquid reductant and a pump for pumping reductant from the first storage container to the injector for injection into an exhaust gas stream, wherein the injector is cooled by reductant. The reductant injection system may comprise a second storage container for storing liquid reductant and is configured such that the injector can be cooled by reductant from the second storage container.

20 Claims, 3 Drawing Sheets

(52) U.S. Cl.
CPC ...... *F01N 2560/06* (2013.01); *F01N 2610/02* (2013.01); *F01N 2610/1406* (2013.01); *F01N 2610/146* (2013.01); *F01N 2610/1433* (2013.01); *F01N 2610/1473* (2013.01)

(56) References Cited

U.S. PATENT DOCUMENTS

| | | | |
|---|---|---|---|
| 9,757,748 B2 * | 9/2017 | Sykes | B05B 3/001 |
| 2004/0025498 A1 * | 2/2004 | Lambert | F02M 53/00 |
| | | | 60/286 |
| 2012/0279576 A1 * | 11/2012 | Hennecke | F01N 3/206 |
| | | | 137/1 |
| 2013/0118155 A1 * | 5/2013 | Domon | F01N 3/208 |
| | | | 60/274 |
| 2013/0145749 A1 * | 6/2013 | Merchant | F01N 3/2066 |
| | | | 60/295 |
| 2014/0331655 A1 * | 11/2014 | Crandell | B01F 5/045 |
| | | | 60/295 |
| 2015/0204225 A1 * | 7/2015 | Wu | B01D 53/92 |
| | | | 137/1 |

FOREIGN PATENT DOCUMENTS

| | | |
|---|---|---|
| DE | 102011102851 A1 | 1/2012 |
| DE | 102011081580 A1 | 9/2012 |
| EP | 2192280 A1 | 6/2010 |
| FR | 2918111 A1 | 1/2009 |
| WO | 0018491 A1 | 4/2000 |
| WO | 2008080695 A1 | 7/2008 |

\* cited by examiner

REDUCTANT INJECTION SYSTEM

CROSS-REFERENCE TO RELATED APPLICATIONS

The present application is a U.S. National Phase of International Patent Application Serial No. PCT/EP2018/064065 entitled "REDUCTANT INJECTION SYSTEM," filed on May 29, 2018. International Patent Application Ser. No. PCT/EP2018/064065 claims priority to German Patent Application No. 10 2017 111 619.2 filed on May 29, 2017. The entire contents of each of the above-referenced applications are hereby incorporated by reference for all purposes.

TECHNICAL FIELD

The present invention is directed to a reductant injection system for an SCR catalyst of an internal combustion engine, the reductant injection system comprising at least one injector, a first storage container for storing liquid reductant and a pump for pumping reductant from the first storage container to the injector for injection into an exhaust gas stream, wherein the injector is cooled by reductant. The usual reductant used in such a system is a urea solution.

BACKGROUND AND SUMMARY

Selective Catalytic Reduction (SCR) Exhaust Aftertreatment System (EATS) is a key technology for reducing NOx emissions from internal combustion engines. SCR EATS is complex and includes at least a storage tank for the urea solution, a pump to pressurize the urea solution and, one or more injectors to precisely meter the urea solution.

In order to be able to introduce the reducing agent into the exhaust stream in an optimal way, the injector must be positioned directly on the hot exhaust pipe. To avoid severe damage to the injector and ageing of the urea solution, the temperature of the injector must not exceed a certain level during operation.

This temperature can be controlled either using an air cooling system mounted on the injector body (see EP 2126302 B1), engine coolant (see EP 2192280 B1) or directly the urea solution (see EP 1117469 B1).

The two first methods are not really suitable for large off-road vehicles and therefore the urea cooling system is often preferred. EP 1117469 B1 shows a reductant injection system according to the preamble of claim 1 using the reductant to cool the injector.

The drawback of such a known system is that below −11° C. the urea solution is frozen and cannot be used to either cool down the injector or reduce the NOx emissions without the help of external heating of the pipes and the tank. If the tank is too large, the defrosting process can take too long and no urea is available to cool down the urea injector: the engine has to run in idle until enough urea is liquefied to cool down the urea injector. If the engine is run too long at idle, the defrosting of the tank will take even longer as the defrosting is performed using the engine coolant. If the idling phase is too long, there is a risk of clogging the SCR catalyst with HC or soot coming from the engine. Further, there is a risk to have all the liquefied urea consumed by the SCR reaction leaving no liquid urea available to cool down the urea injector.

In order to avoid having to defrost the urea tank and lines in very cold climates, it is often chosen to leave the Diesel engine of the vehicle run at idle when it is not used. This can lead very long overnight idling which can have adverse effects on the SCR system such as clogging by PM and HC.

The present invention is therefore directed to providing an improved reductant injection system particularly suitable for cold climates.

This object is solved by the reductant injection system of claim 1. Preferred embodiments of the present invention are the subject matter of the dependent claims.

The present invention provides a reductant injection system for an SCR catalyst of an internal combustion engine, the reductant injection system comprising at least one injector, a first storage container for storing liquid reductant and a pump for pumping reductant from the first storage container to the injector for injection into an exhaust gas stream, wherein the injector is cooled by reductant. Further, the reductant injection system comprises a second storage container for storing liquid reductant and is configured such that the injector can be cooled by reductant from the second storage container.

By providing the second storage container, it is possible to cool the injector even if the first storage container is still frozen. Therefore, the SCR system of the engine can be used more quickly after start-up in cold climates.

Preferably, the first storage container has a larger storage capacity than the second storage container. Thereby, the second storage container can be defrosted more quickly than the first storage container.

Preferably, the first storage container has a storage capacity that is at least 3 times and more preferably at least 5 times larger than the storage capacity of the second storage container.

In an embodiment of the present invention, the second storage container is only used for cooling purposes, and therefore only needs a storage capacity that holds sufficient reductant to maintain the cooling of the injector (or if there are a plurality of injectors, of all injectors). The first storage container is preferably used for providing reductant for injection, and therefore will need a larger storage capacity.

In an embodiment of the present invention, the storage capacity of the first container is between 5% and 20% of the fuel storage capacity of the fuel tank.

In a first variant of the present invention, the first and the second container are formed as a first and a second section of a reductant tank. In particular, the second section can be provided by a subdivision wall placed within a larger tank, the remaining part of the larger tank providing the first container.

In a second variant of the present invention, the first and the second container are formed as a first and a second reductant tank. In this variant, separate tank, which are preferably fluidly connected, are used in order to provide the first and second container. The second variant can be more easily retrofitted with existing reductant storage systems.

Preferably, the reductant injection system is configured such that the injector can be cooled by reductant from the first storage container and by reductant from the second storage container.

In particular, the reductant injection system may comprise a controller having at least an injection mode and a cooling mode.

In the injection mode, reductant from the first storage container is used both for injection into the exhaust gas stream and for cooling of the injector. Preferably, in the injection mode, a part of the reductant pumped by the pump to the injector for cooling is used for injection, while the remaining reductant is flowing back from the injector.

In the cooling mode, reductant from the second storage container is used for cooling of the injector. Preferably, in the cooling mode, reductant is only circulated through the injector and no reductant is injected.

In an embodiment of the present invention, the first and the second container each have a suction module for sucking out reductant from the respective container. The suction module may comprise a fluid line reaching into the container for sucking out reductant from the container. Preferably, the fluid line will reach to the bottom of the container.

Preferably, each suction module has at least one heating arrangement. The heating arrangement may in particular be a heat exchanger to be connected to an engine cooling system and/or an electric heater. Preferably, the suction module of the first container has a heat exchanger to be connected to an engine cooling system. The suction module of the second container may have a heat exchanger to be connected to an engine cooling system and/or an electric heater. An electric heater will allow a quicker defrosting of the second container.

The engine cooling system may be connected to the heat exchangers of the suction modules of the first and second container in such a way that the heat transfer to the first and second container can be varied. Preferably, a controller is programmed to provide, in a state where the second container is not defrosted, a first level of heat transfer to the second container that is higher than a second level of heat transfer that is provided to the second container after it has been defrosted. In particular, the heat transfer may be decreased or stopped by the controller after the second container has been defrosted. Further, the heat transfer to the first container may be started or increased after the first container has been defrosted.

Further, each suction module may have at least one temperature sensor. The temperature sensor may be used for controlling the heat transfer to the first and second container.

In an embodiment of the present invention, the pump is configured for pumping reductant from the first storage container and from the second storage container to the injector.

In particular, the system may have a valve arrangement for separately connecting the inlet of the pump with the first and/or the second container. Preferably, the valve system is controlled to either connect the first storage container or the second storage container to the pump, such that the first and the second storage container are never connected to the pump at the same time.

In an embodiment of the present invention, the second storage container has a fluid connection connecting it to the first storage container for reductant to flow from the second storage container to the first storage container. Thereby, it is easier to make sure that there is always sufficient reductant in the second storage container for cooling.

Preferably, the fluid connection is an overflow, such that reductant will only flow from the second storage container to the first storage container if the second storage container is full.

Alternatively or in addition, the fluid connection is preferably connected to a top part of the first storage container such that in case that the reductant in the first storage container is frozen, reductant from the second storage container will flow on top of the frozen reductant in the first storage container. This will improve the defrosting of the first storage container.

In an embodiment of the present invention, the system comprises a reductant fluid line for allowing reductant to flow back from the injector to the second storage container. Thereby, it is easier to make sure that the second container is filled with sufficient reductant for cooling.

Preferably, at least in the cooling mode, fluid pumped from the second container to the injector will flow back from the injector to the second container.

Alternatively or in addition, at least in the injection mode, fluid pumped from the first container to the injector will flow, as far as it is not injected, back from the injector to the second container. Therefore, even in the injection mode, the returning reductant will fill the second container.

Preferably, the system is configured such that the reductant will always flow back to the second storage container. In particular, there may only be one fluid return line, and this fluid return line may lead from the injector to the second container.

In an embodiment of the present invention, the system comprises a filling orifice for refilling of reductant. As the reductant is used up, the orifice will allow to replenish the storage system with reductant.

Preferably, the refilling orifice is connected with and/or arranged at the second storage container. In particular, the refilling orifice may be arranged such that the first storage container is filled via the second storage container. This will make sure that the second container is completely filled.

The injector may comprises a valve for dosing of reductant into the exhaust gas stream and a fluid passage for reductant to flow through the injector for cooling. In particular, a part of the reductant flowing through the injector for cooling may be injected into the exhaust gas stream if the valve is open.

In an embodiment of the present invention, the second storage container has a capacity of at least 10 liters, preferably of at least 50 liters. Even if the second container is only used for cooling purposes, which is preferred, such a storage capacity is needed if the engine is a large engine.

In an embodiment of the present invention, the first storage container has a capacity of at least 100 liters, preferably of at least 500 liters. Because the first storage container is preferably used for injection, it will need a large capacity, especially for large engines.

The present invention further comprises a reductant storage system for a reductant injection system as described above. The reductant storage system in particular comprises the first and the second container described above. The storage system may further comprises a pump, valves and/or a controller as described above.

The present invention further comprises an exhaust gas aftertreatment system 23 comprising an SCR-catalyst 24 and a reductant injection as described above.

Preferably, in the exhaust gas aftertreatment system 23, the injector is directly connected to an exhaust gas duct 22 of the exhaust gas aftertreatment system 23, in particular upstream of the SCR-catalyst 24, in particular directly in front of the SCR-catalyst 24.

The present invention further comprises an internal combustion engine having an exhaust gas aftertreatment system 23 as described above and/or a reductant injection system as described above.

The engine may in particular be a Diesel engine.

In an embodiment, the engine has a displacement volume of more than 10 liters, preferably of more than 20 liters.

The present invention further comprises a working machine comprising an engine as describe above.

The working machine preferably is a mobile machine 20, in particular an off-road machine.

Preferably, the engine is used for driving a propulsion of the working machine 20. The propulsion can be mechanical, electrical or hydraulic.

In an embodiment, the working machine 20 is an earth moving machine, in particular a dumper truck and/or excavator.

In an embodiment, the working machine is a transport or load handling machine, in particular a train and/or crane.

The reductant used for the present invention is preferably a urea solution, preferably an aqueous solution of urea.

BRIEF DESCRIPTION OF THE FIGURES

The present invention will now be described on the basis of preferred embodiments and using drawings.

The drawings show in

DETAILED DESCRIPTION

The embodiments of the present invention are reductant storage systems for delivering urea solution to a urea dosing system having one or more injectors (7). Each urea injector (7) comprises a valve that is controlled in order to control the amount of urea injected into the exhaust gas stream. Because the urea injector is located directly at the catalyst, it has to be cooled.

In the present invention, this is done by the urea that is used for injection. The urea is pumped from a storage container to the injector, circulates in the injector for cooling purposes, and flows back to the storage container. If the injection valve is opened, a part of the urea supplied by the pump and flowing through the injector is injected into the exhaust gas stream. In such system the urea solution is used to reduce the NOx emissions and to control the temperature of the injectors mounted on the exhaust pipe.

Figure 1:
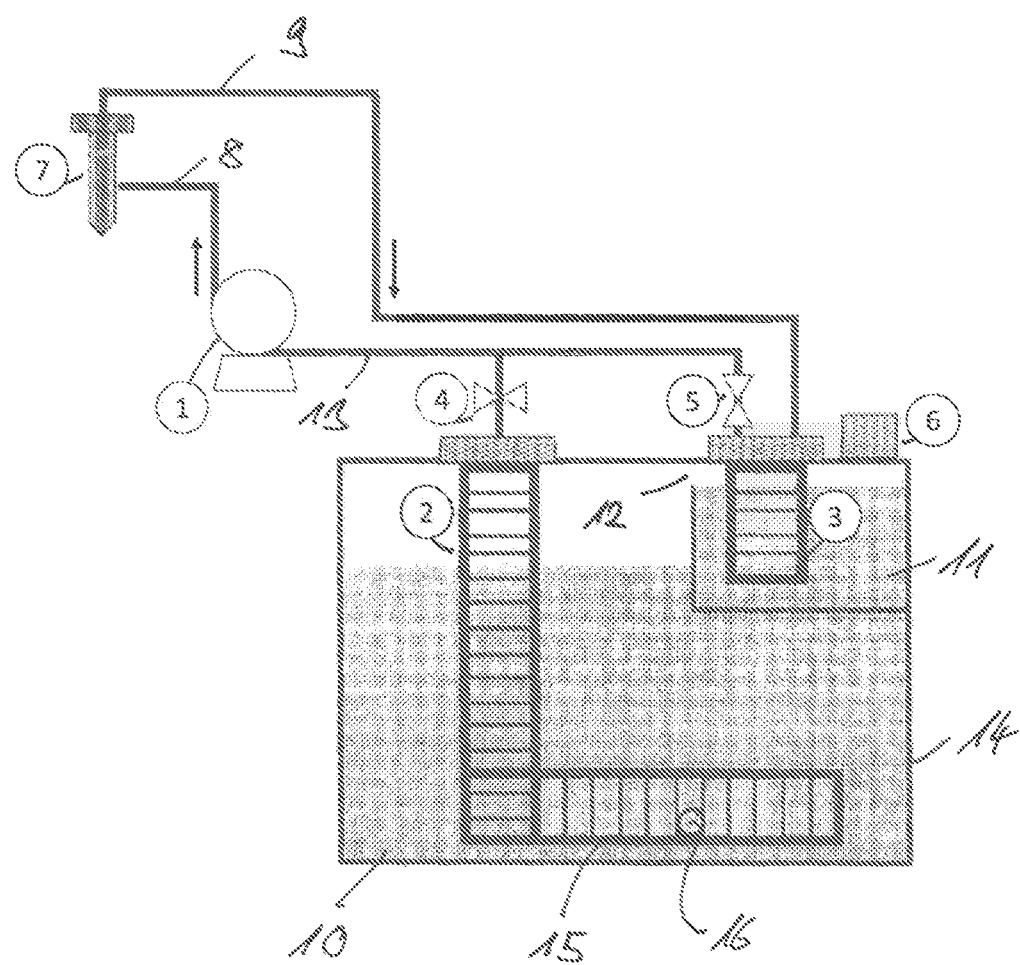
FIG. 1: a first embodiment of an inventive system comprising a reductant tank having a first and a second section and in FIG. 2: a second embodiment of an inventive system comprising a first and second reductant tank.
Figure 2:
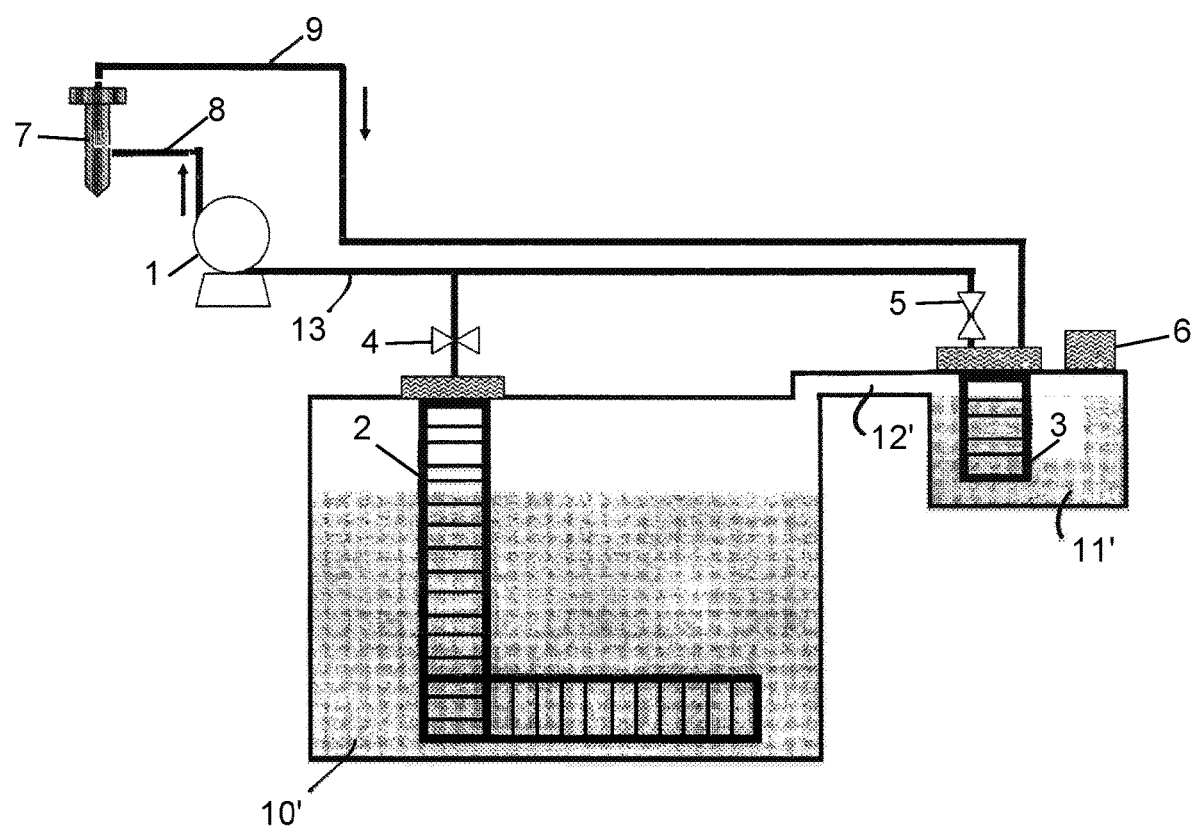
Figure 3:
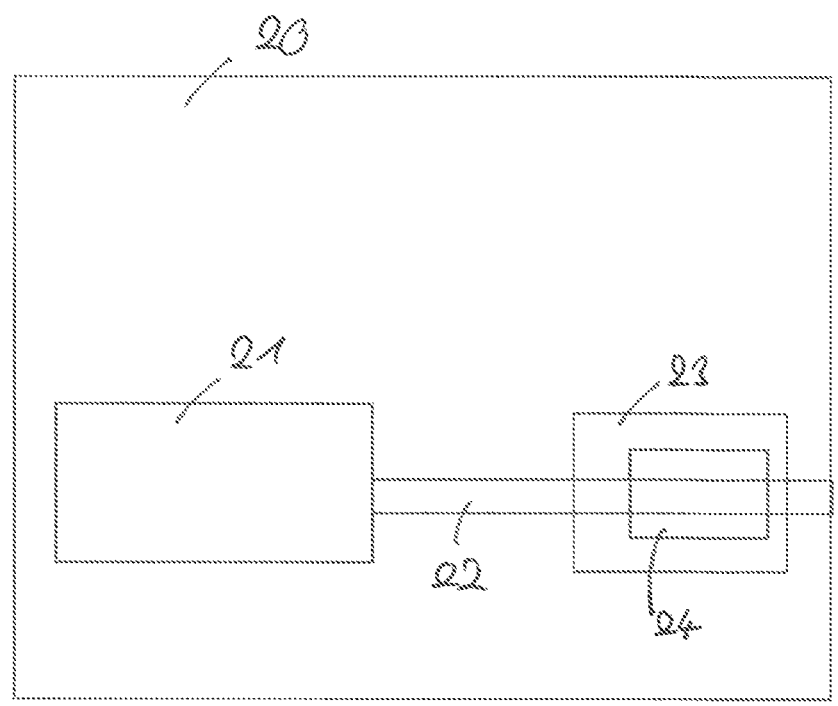
FIG. 3: a block diagram of a working machine according to at least one example of the present disclosure.

The present invention provides a urea storage system having a first urea storage container (10, 10') and a second urea storage container (11, 11'). In the first embodiment shown in FIG. 1, the first and the second urea storage container are provided by a first and second section (10, 11) of a tank (14). In the second embodiment shown in FIG. 2, the first and the second urea storage container are provided by a first and a second tank (10', 11'). In the latter design, the second tank (11') could be retrofitted to an existing urea injection system using urea solution to cool the injectors.

The first urea storage container has a larger storage capacity than the second urea storage container, and is therefore provided by a larger section or larger tank. The first container is the dosing or primary tank and the second container is the cooling or secondary tank. The tank or tank section may be insulated to prevent freezing of the urea solution as much as possible.

The containers are connected to the pump (1) in such a way that urea from each of the containers (10, 10', 11, 11') can be pumped to the injector (7). For this purpose, the containers are connected in parallel via line (13) to the pump, which in turn is connected to the injector (7) by line (8). A return line (9) for the urea connects the injector (7) at least with the second container (11, 11'). In the embodiments, the return line (9) is only connected to the second container (11, 11'), such that reductant flowing back from the injector (7) will always flow into the second container first.

The first container (10, 10') is connected to the second container (11, 11') by a fluid connection (12, 12') via which urea can flow from the second container to the first container. The fluid connection is formed by an overflow, such that urea will only flow from the second container to the first container if the second container is full. This makes sure that there is always urea in the second container for cooling the injector.

It has to be noted that the return flow from the urea injection system is only linked to the second container, i.e. the cooling tank or tank section. Thus even when the urea is fed from the first container, i.e. the dosing tank or tank section to the injector, the return flow is always going back to the second container, i.e. the cooling tank or tank section.

It is important that the second container, i.e. the cooling tank or tank section is always full and thus the return urea flow always enters inside it and the urea filling is made through this tank. The second container, i.e. the cooling tank or tank section, is therefore equipped with a filling cap or orifice (6). Having the urea filling orifice on the second container, i.e. the cooling tank or tank section helps keeping it always full in order to always be able to cool down the injector (7).

At least one suction module (2 and 3) is provided in each container, i.e. in each tank or tank section. The suction modules has a suction line for sucking urea from the container, and at least one heating element 15, formed e. g. by a heat exchanger or a heater. The suction modules are preferably heated up using engine coolant but in order to have a fast defrosting of the urea, at least one of the suction modules could use an electrical heater. The electrical heater is preferably provided for the second container (11, 11'). There can be more than one suction module inside each container, i.e. tank or tank section.

If the second container is heated up, the return flow from the urea injector will also help to defrost the urea solution in the first container or prevent having it frozen.

The suction modules are equipped with urea quality, level and temperature sensors, (e.g., temperature sensor 16), however the suction module of the second container, i.e. the cooling tank or tank section could be simplified in order to include only a heater as the urea from the cooling tank is not intended to be used for emission reduction.

The invention also comprises two valves (4 and 5) which allow the selection between the two containers, i.e. the two tanks or tank sections. The two valves cannot be opened or closed at the same time during engine operation. Thus when the injector cooling is needed while no emission reduction is required, the valve (5) is opened and the valve (4) is closed. This selection is made by the engine controller or the urea injection system controller.

The invention works using two separate modes:

The cooling mode: in this mode, the urea injection is stopped and the urea is only used to cool down/protect the injectors from overheating. The valve 4 is closed and the valve 5 is opened.

The dosing mode: in this mode, the urea injection is started and the urea is used to reduce the NOx emissions as well as to cool down the urea injectors. The valve 5 is closed and the valve 4 is opened. If the urea pressure inside the system cannot be increased to the working pressure, the mode is switched back to the cooling mode.

There may further be an idling mode where there is neither cooling nor injection. In this mode, pump (1) is not operated.

If the urea storage system in frozen at start-up of the engine, the urea solution will first have to be defrosted before SCR catalytic reaction can be taken up.

There is preferably provided an electric heater for the pipes (8, 9, 13) connecting the urea storage containers, the pump and the injector. The pump can be heated electrically and/or via the engine cooling system.

At least the first urea storage container (10, 10') is defrosted by a heat exchanger connected to the engine cooling system. This heat exchanger is part of the suction module (2). In order to defrost the urea solution, it is therefore necessary to provide enough engine heat. This is usually done by running the engine in idle mode.

There is a requirement that after start of the engine, the engine may run for 20 minutes in idle mode, and then for another 50 minutes using a higher speed, before the SCR has to be operational. During the first 20 minutes in idle mode, no urea solution is injected and no cooling may be required. For the following operation at a higher speed, cooling is however required.

The second container provides sufficient urea for the cooling purpose already after the idling phase, because it is defrosted more quickly than the first container. This is because it has a smaller storage capacity. Further, there may be an electric heater for the second storage container. Alternatively or in addition, the engine cooling system my be controlled such that more heat is transferred to the second container after start-up with a frozen storage system and defrosting of the first container is only started once the second container has been defrosted.

Preferably, the controller of the engine or of the urea injection system will automatically control the urea injection system such that the engine is first run, after start-up with a frozen urea storage system, in an idling mode and/or the cooling mode until a sufficient quantity of urea in the first tank is defrosted to start the dosing mode.

In particular, the controller of the engine or of the urea injection system may automatically control the urea injection system such that the engine is first run, after start-up with a frozen urea storage system, in an idling mode and/or an electric heating is performed for the second storage container until a sufficient quantity of urea is melted in the second storage container to start the cooling mode. The engine is then run in the cooling mode with a higher engine speed than in the idling mode, in order to create more heat, which will speed up the melting of the urea in the first container.

The controller of the engine or of the urea injection system may detect a frozen state of the urea storage system, e.g. by using the signals form the temperature sensors of the suction modules (2) and/or (3).

Further, the heating of the urea containers can be controlled by the temperature sensors of the suction modules. For example, there can be a valve in the engine coolant circle, by which the flow of engine coolant through the suction modules is controlled depending on the temperature of the urea in the first and second container.

To increase the cooling efficiency, it is possible to add a heat exchanger on the urea solution lines located between the valve 4 and 5.

The controller can be further configured in such a way that during normal operation of the engine, if all the melted urea has been used up by injection, the engine is operated in a low NOx mode, and the urea injection system is operated in the cooling mode, i.e. with the urea injector cooled by the coolant from the second container, with switched-off urea injection.

The first urea container may e. g. comprise about 1,000 l of urea solution. This corresponds to about 10% of the fuel storage fuel capacity of the fuel tank. The requirement is that the refilling of fuel and refilling of urea can be done at the same time, i.e., that the respective containers have a capacity that corresponds to the same working time. The second urea container may e.g. have a capacity of about 50 to 100 l. It does not have to be scaled with the first container, because it is only used for cooling purposes.

The embodiments have been described with respect to urea as the reductant. The embodiments could however also be used with any other kind of fluid reductant.

The invention could in particular be applied to all off-road machines and/or all our excavators, trucks, etc. equipped with SCR systems and urea cooled injectors.

The invention claimed is:

1. A reductant injection system for an SCR catalyst of an internal combustion engine, the reductant injection system comprising:
   at least one injector;
   a first storage container for storing liquid reductant;
   a pump for pumping reductant from the first storage container to the injector for injection into an exhaust gas stream, wherein the injector is cooled by reductant; and
   a second storage container for storing liquid reductant that is configured such that the at least one injector is cooled by reductant from the second storage container,
   wherein the reductant injection system is configured such that the injector is cooled by reductant from the first storage container and by reductant from the second storage container, wherein the reductant injection system comprises a controller having at least an injection mode and a cooling mode, and
   wherein at least one of the following applies:
      in the injection mode, reductant from the first storage container is used both for injection into the exhaust gas stream and for cooling of the injector, and
      in the cooling mode, reductant from the second storage container is used for cooling of the injector.

2. The system of claim 1, wherein the first storage container has a larger storage capacity than the second storage container.

3. The system of claim 1, wherein the first and the second container are formed by a first and a second section of a reductant tank.

4. The system of claim 1, wherein at least one of the following applies:
   in the injection mode, a part of the reductant pumped by the pump to the injector for cooling is used for injection, while the remaining reductant is flowing back from the injector, and
   in the cooling mode, reductant is only circulated through the injector and no reductant is injected.

5. The system of claim 1, wherein the first and the second container each have a suction module for sucking out reductant from the respective container, wherein each suction module has at least one heating arrangement.

6. The system of claim 1, wherein the pump is configured for pumping reductant from the first storage container and from the second storage container to the injector.

7. The system of claim 1, wherein at least one of the following applies:
   the second storage container has a fluid connection connecting it to the first storage container for reductant to flow from the second storage container to the first storage container, wherein the fluid connection is an overflow, such that reductant will only flow from the second storage container to the first storage container if the second storage container is full, and the fluid connection is connected to a top part of the first storage container such that in case that the reductant in the first storage container is frozen, reductant from the second storage container will flow on top of the frozen reductant in the first storage container.

8. The system of claim 1, wherein the system comprises a reductant fluid line for allowing reductant to flow back from the injector to the second storage container, wherein the system is configured such that the reductant will always flow back to the second storage container.

9. The system of claim 1, wherein the system comprises a filling orifice for refilling of reductant, wherein the refilling orifice is at least one of connected with the second storage container and arranged at the second storage container, wherein the first storage container is filled via the second storage container.

10. The system of claim 1, wherein the second storage container has a storage capacity of at least 10 liters.

11. A reductant storage system for a reductant injection system according to claim 1, the reductant storage system comprising at least the first and the second container.

12. An exhaust gas aftertreatment system comprising an SCR-catalyst and a reductant injection system according to claim 1, wherein the at least one injector is directly connected to an exhaust gas duct of the exhaust gas aftertreatment system upstream of the SCR-catalyst.

13. An internal combustion engine comprising at least one out of:
   a) an exhaust gas aftertreatment system according to claim 12, and
   b) a reductant injection system comprising:
      at least one injector;
      a first storage container for storing liquid reductant;
      a pump for pumping reductant from the first storage container to the injector for injection into an exhaust gas stream, wherein the injector is cooled by reductant; and
      a second storage container for storing liquid reductant that is configured such that the at least one injector is cooled by reductant from the second storage container,
      wherein the reductant injection system is configured such that the injector is cooled by reductant from the first storage container and by reductant from the second storage container, wherein the reductant injection system comprises a controller having at least an injection mode and a cooling mode, wherein at least one of the following applies:
         in the injection mode, reductant from the first storage container is used both for injection into the exhaust gas stream and for cooling of the injector, and
         in the cooling mode, reductant from the second storage container is used for cooling of the injector.

14. A working machine comprising an engine according to claim 13, wherein the working machine is a mobile machine, wherein the engine is used for driving a propulsion of the working machine, wherein the working machine is at least one out of an earth moving machine, a transport machine and a load handling machine.

15. The system of claim 2, wherein the storage capacity of the first storage container is at least 3 times larger than the storage capacity of the second storage container.

16. The system of claim 5, wherein the at least one heating arrangement includes at least one out of a heat exchanger to be connected to an engine cooling system, an electric heater, and a temperature sensor.

17. The system of claim 16, further comprising a valve arrangement for separately connecting an inlet of the pump with at least one out of the first and the second container, wherein the valve system is controlled to connect the first storage container or the second storage container to the pump, such that the first and the second storage container are never connected to the pump at the same time.

18. The exhaust gas aftertreatment system of claim 12, wherein the at least one injector is directly in front of the SCR-catalyst.

19. The working machine of claim 14, wherein the working machine is a dumper truck or a crane.

20. The system of claim 1, wherein the first and the second container are formed by separate reductant tanks.

* * * * *